(12) United States Patent
Mills et al.

(10) Patent No.: US 10,760,802 B2
(45) Date of Patent: Sep. 1, 2020

(54) WHOLE HOUSE FRESH AIR SYSTEM WITH A WIRELESS INTERFACE

(71) Applicants: Kirk Mills, El Dorado Hills, CA (US); Kimberley Mills, El Dorado Hills, CA (US)

(72) Inventors: Kirk Mills, El Dorado Hills, CA (US); Kimberley Mills, El Dorado Hills, CA (US)

(73) Assignee: CENTRAVENT, LLC, El Dorado Hills, CA (US)

( * ) Notice: Subject to any disclaimer, the term of this patent is extended or adjusted under 35 U.S.C. 154(b) by 255 days.

(21) Appl. No.: 16/027,078

(22) Filed: Jul. 3, 2018

(65) Prior Publication Data
US 2020/0011555 A1    Jan. 9, 2020

(51) Int. Cl.
| | | |
|---|---|---|
| B01D 46/00 | (2006.01) | |
| F24F 7/06 | (2006.01) | |
| F24F 11/50 | (2018.01) | |
| F24F 13/08 | (2006.01) | |
| F24F 11/56 | (2018.01) | |
| F24F 11/74 | (2018.01) | |
| F24F 13/28 | (2006.01) | |
| F24F 13/14 | (2006.01) | |
| F24F 7/02 | (2006.01) | |
| F24F 7/04 | (2006.01) | |

(52) U.S. Cl.
CPC ............. *F24F 7/065* (2013.01); *B01D 46/00* (2013.01); *F24F 7/02* (2013.01); *F24F 7/04* (2013.01); *F24F 11/56* (2018.01); *F24F 11/74* (2018.01); *F24F 13/084* (2013.01); *F24F 13/1426* (2013.01); *F24F 13/28* (2013.01); *F24F 2013/1433* (2013.01); *F24F 2221/02* (2013.01)

(58) Field of Classification Search
CPC ..... B01D 46/00; F24F 7/00; F24F 7/02; F24F 7/04; F24F 7/065; F24F 11/56; F24F 13/28; F24F 13/084
USPC .......... 454/237, 239, 250, 251; 55/467, 473, 55/419, 493
See application file for complete search history.

(56) References Cited

U.S. PATENT DOCUMENTS

| | | |
|---|---|---|
| 1,924,489 A | 8/1933 | Ferris |
| 1,931,156 A | 10/1933 | Persons |
| (Continued) | | |

OTHER PUBLICATIONS

Field Controls, LLC, Fresh Air Systems webpages, http://www.fieldcontrols.com (Jul. 3, 2018).

*Primary Examiner* — Robert A Hopkins
(74) *Attorney, Agent, or Firm* — Jim H. Salter; Inventive Law Inc.

(57) ABSTRACT

A whole house fresh air system with a wireless interface is disclosed. An example embodiment includes: a damper installed in a structure; a collector box coupled to an intake side of the damper; a disburser box coupled to an output side of the damper; a plurality of intake vents mounted to the structure, the plurality of intake vents having access to fresh air outside of the structure, the plurality of intake vents being coupled to the collector box via a plurality of intake ducts routed through an interior of the structure; and a plurality of output vents installed within the structure, the plurality of output vents having access to air inside of the structure, the plurality of output vents being coupled to the disburser box via a plurality of output ducts routed through an interior of the structure.

20 Claims, 8 Drawing Sheets

(56) References Cited

U.S. PATENT DOCUMENTS

| | | | |
|---|---|---|---|
| 2,278,581 A | 4/1942 | Macdougald | |
| 2,349,627 A | 5/1944 | Kemmer | |
| 2,483,377 A | 9/1949 | Young | |
| 2,612,831 A | 10/1952 | Lohman, Jr. | |
| 2,668,491 A | 2/1954 | Gerlitz | |
| 2,875,678 A | 3/1959 | Wyley | |
| 4,261,255 A | 4/1981 | Anderson | |
| 4,375,183 A | 3/1983 | Lynch | |
| 4,385,550 A | 5/1983 | Steiner | |
| 4,416,415 A | 11/1983 | Kolt | |
| 4,501,194 A | 2/1985 | Brown | |
| 4,501,389 A | 2/1985 | Kolt | |
| 4,510,851 A | 4/1985 | Sarnosky | |
| 4,594,940 A | 6/1986 | Wolbrink | |
| 4,596,180 A | 6/1986 | Steiner | |
| 4,628,802 A | 12/1986 | Steiner | |
| 4,766,806 A | 8/1988 | Tomiser, Jr. | |
| 4,779,518 A | 10/1988 | Artwick | |
| 4,784,049 A | 11/1988 | Steiner | |
| 4,939,986 A | 7/1990 | Turner | |
| 5,060,901 A | 10/1991 | Lathrop | |
| 5,065,585 A * | 11/1991 | Wylie | F24F 3/044 62/89 |
| 6,533,656 B2 | 3/2003 | Hertel | |
| 6,752,713 B2 | 6/2004 | Johnson, Jr. | |
| 6,802,770 B2 | 10/2004 | Larson | |
| 6,979,169 B2 | 12/2005 | Penlesky | |
| 7,128,303 B2 | 10/2006 | Penlesky | |
| 7,398,821 B2 | 7/2008 | Rainer | |
| 7,455,500 B2 | 11/2008 | Penlesky | |
| 7,497,774 B2 | 3/2009 | Stevenson | |
| 7,731,477 B2 | 6/2010 | Erni | |
| 7,774,102 B2 | 8/2010 | Butler | |
| 8,165,719 B2 | 4/2012 | Kinney | |
| 8,543,244 B2 | 9/2013 | Keeling | |
| 8,550,368 B2 | 10/2013 | Butler | |
| 8,791,587 B2 | 7/2014 | Smith, Jr. | |
| 9,261,290 B2 | 2/2016 | Storm | |
| 9,322,568 B2 | 4/2016 | Aycock | |
| 9,338,810 B2 | 5/2016 | Erickson | |
| 2002/0112409 A1 | 8/2002 | Knowles | |
| 2007/0145160 A1 | 6/2007 | Martin | |
| 2008/0096482 A1 | 4/2008 | Wettergren | |
| 2009/0013703 A1 | 1/2009 | Werner | |
| 2011/0151766 A1 | 6/2011 | Sherman | |
| 2011/0223850 A1 | 9/2011 | Narayanamurthy | |
| 2013/0166075 A1 | 6/2013 | Castillo | |
| 2013/0244563 A1 | 9/2013 | Noteboom | |
| 2014/0206278 A1 | 7/2014 | Stevenson | |
| 2016/0054016 A1 | 2/2016 | Takahashi | |

\* cited by examiner

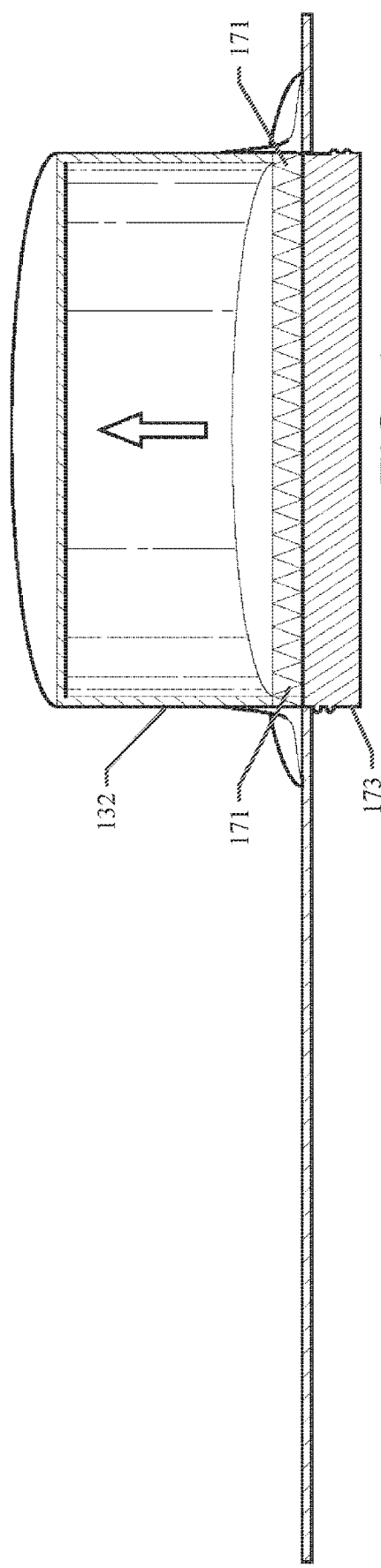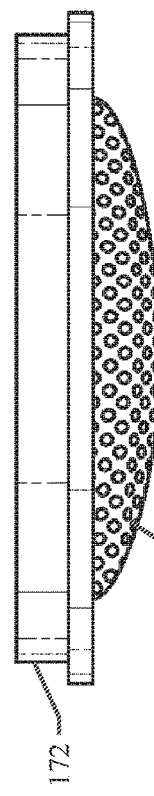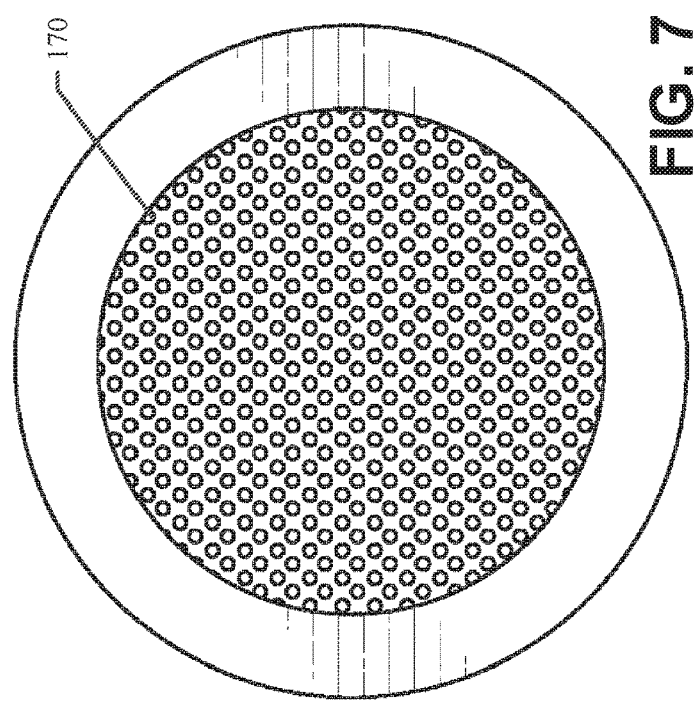

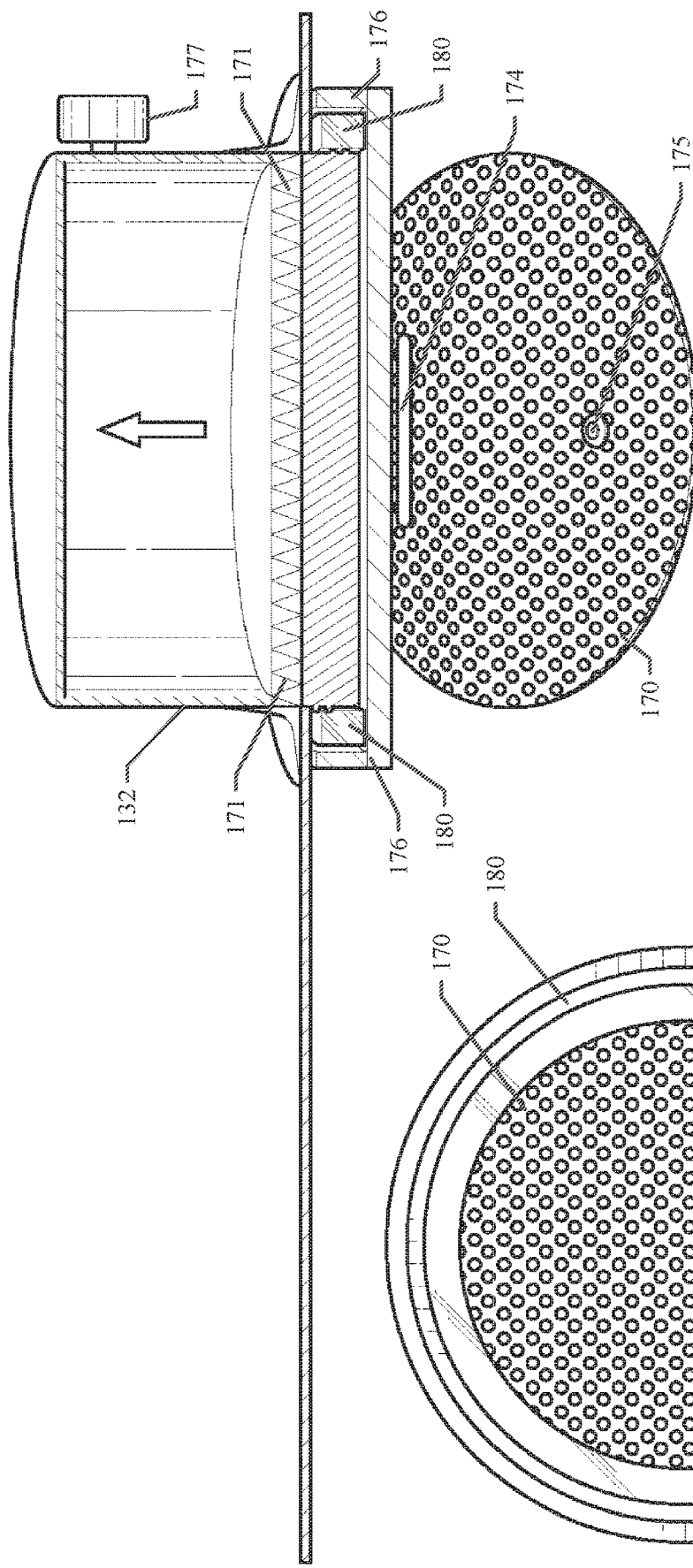

```
METHOD FOR PROVIDING
WHOLE HOUSE FRESH AIR
-1000-
```

↓

Install a damper in a structure.
-1010-

↓

Couple a collector box to an intake side of the damper.
-1020-

↓

Couple a disburser box to an output side of the damper.
-1030-

↓

Mount a plurality of intake vents to the structure, the plurality of intake vents having access to fresh air outside of the structure.
-1040-

↓

Connect the plurality of intake vents to the collector box via a plurality of intake ducts routed through an interior of the structure.
-1050-

↓

Install a plurality of output vents within the structure, the plurality of output vents having access to air inside of the structure.
-1060-

↓

Connect the plurality of output vents to the disburser box via a plurality of output ducts routed through an interior of the structure.
-1070-

↓

End

FIG. 11

WHOLE HOUSE FRESH AIR SYSTEM WITH A WIRELESS INTERFACE

TECHNICAL FIELD

The disclosed subject matter relates to the field of heating, cooling and ventilating equipment for structures, and particularly although not exclusively, to a whole house fresh air system with a wireless interface.

COPYRIGHT

A portion of the disclosure of this patent document contains material that is subject to copyright protection. The copyright owner has no objection to the facsimile reproduction of the patent document or the patent disclosure, as it appears in the Patent and Trademark Office patent files or records, but otherwise reserves all copyright rights whatsoever. The following notice applies to the disclosure provided herein and to the drawings that form a part of this document: Copyright 2017-2018, Kirk and Kimberley Mills; All Rights Reserved.

BACKGROUND

Heating and cooling the space in residential and commercial buildings accounts for a primary share of building energy consumption. Existing buildings use either an air conditioning system or a whole house fan for cooling and ventilating residential and commercial building structures. Traditional air conditioning systems function by altering the temperature and humidity of the air and then pumping the treated air throughout the structure. The thermostat powers on the air conditioner until the structure reaches a set point temperature. While effective at conditioning the air, such traditional air conditioning systems are costly to run and not energy efficient. Additionally, when the outside ambient air temperature is lower than the internal air temperature, outside ambient air could instead be used to effectively cool the structure, reducing the need to run a costly air conditioning system. Further, air conditioning systems merely circulate air located within a building, and do not bring any outside air, so any harmful environmental elements (e.g. dust, disease, chemicals, etc.) remain within the building.

In response to such problems, some structures instead use whole house fans to force air through the structure. Whole house fans consist of one or more exhaust fans, typically placed in the attic or an upper floor, and function by creating a negative pressure inside of the structure to draw cooler air in from the outside. The cooler outside air is forced up through the ceiling into the attic where the air is exhausted out through a vent. Louvered shutters are often placed over the vent to prevent cooled or heated air from escaping when the fan is not in use. Whole house systems move large amounts of air and allow for the entire structure air volume to be recycled with multiple air exchanges per hour, removing latent heat within the structure. Traditional whole house fans are installed on the attic floor such that they directly contact the ceiling of the structure. As such, the large capacity whole house fans, necessary to create sufficient negative pressure to draw the cooler air inside in the structure, can create undesirable noise and vibrations that penetrate the occupied space of the building. Advantageously, these systems require less energy than air conditioning systems and can reduce the need for air conditioning and therefore reduce structure energy consumption while still providing a comfortable space. However, such whole house fans require open windows or doors to serve as intake air vents. Thus, the user is required to manually control the air flow. The opened windows or doors, however, can allow in dust, pollen, and other pollutants from the exterior incoming air. The opened windows or doors can also create security problems for the owner. Thus, a better whole house fan system is needed that does not require open windows or doors.

SUMMARY

The whole house fresh air system of an example embodiment comprises a plurality of intake vents that can be installed between trusses of a structure and mounted under the eaves or soffits of the roof. Each of the intake vents can be equipped with a framed screen on the outside to eliminate the entry of animals, bugs, or debris. Each of the intake vents can be connected to an intake duct. Each of the intake ducts can be connected to a collector box. The collector box serves to collect fresh outside air from the plurality of intake vents and provide the fresh outside air to a damper. The damper is provided to controllably regulate the flow of fresh outside air through the whole house fresh air system. A local control unit is provided to control the operation of the damper and to provide an interface to the wireless remote controller, which can be used to remotely and wirelessly control the operation of the whole house fresh air system via the local control unit. In an example embodiment, the damper can be powered and manipulated by an actuator under control of the local control unit. The wireless remote controller can be used by a user to command the local control unit to apply a high, low, and a fresh air setting to the damper with the ability to shut off the flow of fresh air if so desired, to allow for a window or door to be opened instead.

On the output side of the whole house fresh air system of an example embodiment, the damper is connected to a disburser box, which supplies fresh outside air to a plurality of output vents via output ducts. The plurality of output vents can be implemented as ceiling mounted round filtered vents. The output vents can each have a hinged perforated removable grill to allow a replaceable filter to be inserted into and retained by the output vent. This replaceable filter serves to filter out the outdoor pollens and allergens from entering the home or structure. The outer ceiling plate of the output vent can have the option for an orbital light to be inserted or embedded into the outer ceiling plate to provide a lighted output vent option. Example embodiments are described in more detail below.

BRIEF DESCRIPTION OF THE DRAWINGS

Embodiments are illustrated by way of example and not limitation in the figures of the accompanying drawings, in which:

FIGS. 6 through 8 illustrate a detail of an example embodiment of the whole house fresh air system showing the output vents with a perforated removable grill and a replaceable filter;

FIGS. 9 and 10 illustrate a detail of an example embodiment of the whole house fresh air system showing the output vents with a hinged perforated removable grill, a replaceable filter, and an embedded orbital light; and FIG. 11 illustrates a flow diagram representing a sequence of operations performed in a method according to an example embodiment.

DETAILED DESCRIPTION

In the following detailed description, reference is made to the accompanying drawings that form a part hereof, and in which are shown, by way of illustration, specific embodiments in which the disclosed subject matter can be practiced. It is understood that other embodiments may be utilized and structural changes may be made without departing from the scope of the disclosed subject matter.

According to various example embodiments of the disclosed subject matter as described herein, there is disclosed, illustrated, and claimed a whole house fresh air system with a wireless interface. The example embodiments disclosed herein provide an apparatus, system, and method implemented as a whole house fresh air system.

Figure 1:
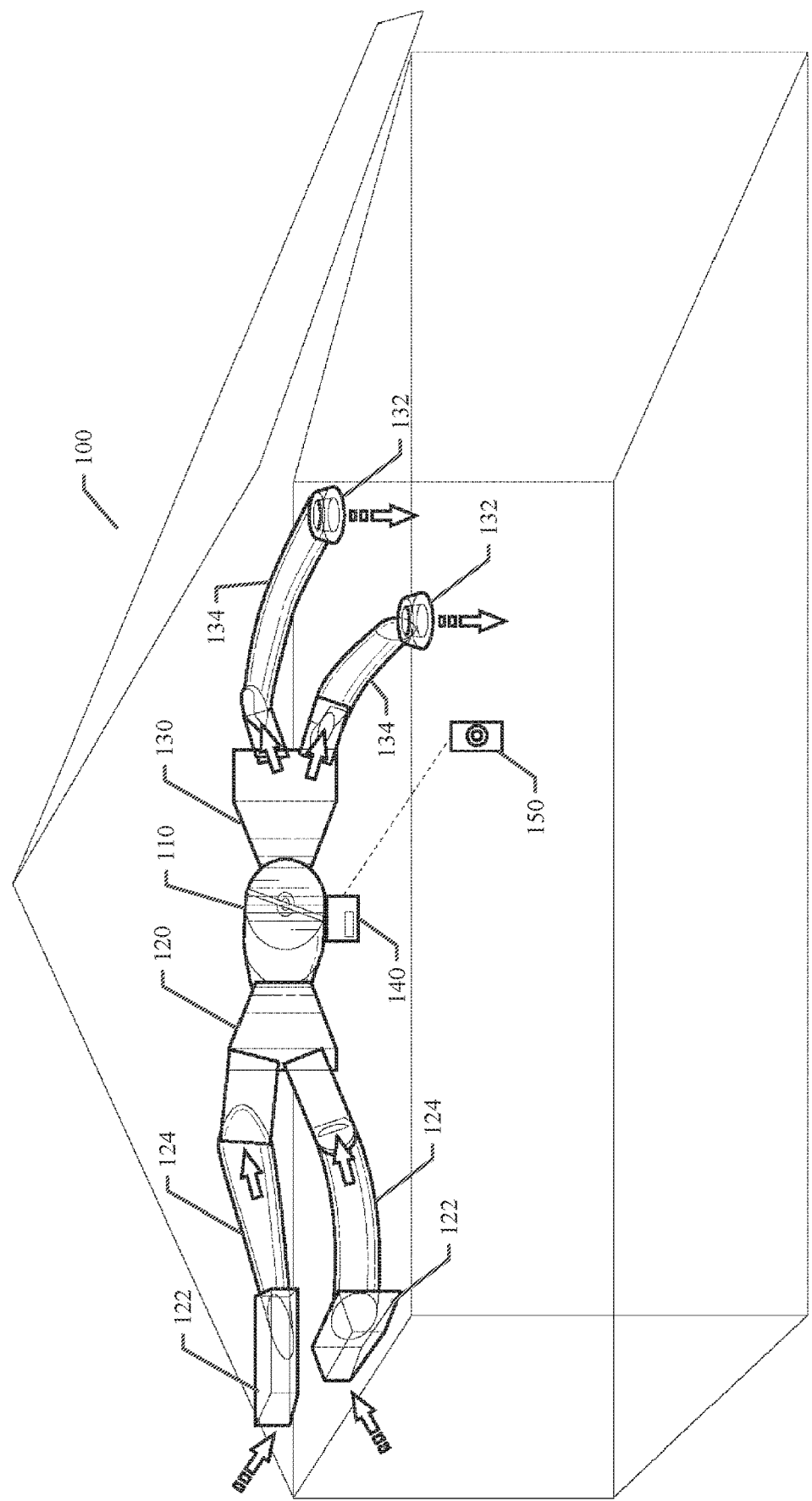
FIGS. 1 and 2 illustrate an example embodiment of the components of the whole house fresh air system.
Figure 2:
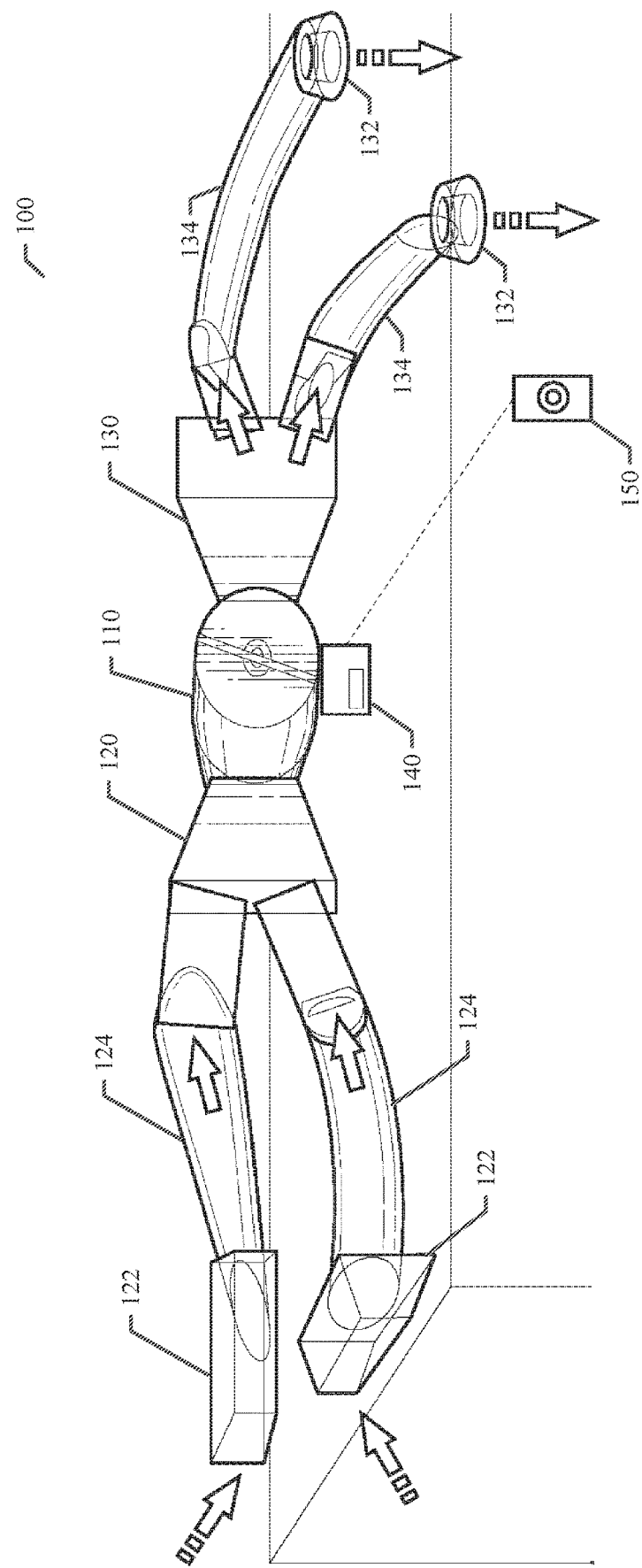

FIGS. 1 and 2 illustrate an example embodiment of the components of the whole house fresh air system 100. Referring now to FIGS. 1 and 2 in an example embodiment, the whole house fresh air system 100 of an example embodiment comprises a plurality of intake air vents 122 that can be installed between trusses of a structure and mounted under the eaves or soffits of the roof. Each of the intake vents 122 can be equipped with a framed screen (e.g., a 4"×22" fine mesh screen) on the outside to eliminate the entry of animals, bugs, or debris. Each of the intake vents 122 can be connected to an intake duct 124 (e.g., an R-8 flexible duct). Each of the intake ducts 124 can be routed through an attic or crawl space of a structure and connected to a collector box 120. The collector box 120 serves to collect fresh outside air from the plurality of intake vents 122 and provide the fresh outside air to a damper 110. The damper 110 is provided to controllably regulate the flow of fresh outside air through the whole house fresh air system 100. The local control unit 140 is provided to control the operation of the damper 110 and to provide an interface to the wireless remote controller 150, which can be used to remotely and wirelessly control the operation of the whole house fresh air system 100 via the local control unit 140. In an example embodiment, the damper 110 can be powered and manipulated by a 24 volt actuator under control of the local control unit 140. The conventional use of dampers is well known in the art. The 24 volt damper actuator can be energized by the local control unit 140 based on commands sent wirelessly by the wireless remote controller 150. In an example embodiment, the wireless remote controller 150 can be mounted on an interior wall of the home or structure, for example. The wireless remote controller 150 can be used by a user to command the local control unit 140 to apply a high, low, and a fresh air setting to the damper 110 with the ability to shut off the flow of fresh air if so desired, to allow for a window or door to be opened instead.

On the output side of the whole house fresh air system 100 of an example embodiment, the damper 110 is connected to a disburser box 130, which supplies fresh outside air to a plurality of output vents 132 via output ducts 134. A plurality of output ducts 134 can be routed through an attic or crawl space of a structure and connected at one end to the disburser box 130. A plurality of output vents 132 can be connected to the other end of the output ducts 134. The size, quantity, and routing of the intake ducts 124 and the output ducts 134 can vary based on the size of the whole house fresh air system 100 and the size of the structure in which the system 100 is installed. The plurality of output vents 132 can be implemented as ceiling mounted round filtered vents. In particular example embodiments shown in FIGS. 6 through 10 and described in more detail below, the output vents 132 can each have a hinged or non-hinged perforated removable grill 170 to allow a replaceable filter 171 to be inserted into and retained by the output vent 132. This replaceable filter 171 serves to filter out the outdoor pollens and allergens from entering the home or structure. As described in more detail below, the outer ceiling plate 176 of the output vent 132 can have the option for an orbital 24 volt light 180 to be inserted or embedded into the outer ceiling plate 176 to provide a lighted output vent 132 option.

The whole house fresh air system 100 of an example embodiment can be configured to work in conjunction with remotely programmable whole house fans. For example, if a user desires to program or control the whole house fresh air system 100 remotely with their mobile phone, the whole house fresh air system 100 can be energized open first in a series of operations. Once an outdoor damper is opened, the local control unit 140 of the whole house fresh air system 100 can energize the system to engage, bringing outside fresh air through the intake vents 122, and filtering the air by use of the replaceable filters 171 in the output vents 132 before allowing the filtered fresh air to enter the interior of the home or structure. The whole house fresh air system 100 can cool the home or structure and flush air through the attic, removing the heat load. The whole house fresh air system 100 of an example embodiment can be configured to support a WiFi, Bluetooth™, or other wireless protocol control system or wireless controller that allows the user to control the whole house fresh air system 100 from anywhere while supporting the full capabilities and benefits of the whole house fan system 100 without having to leave windows or doors open. As a result, the security of the home or structure is retained. The whole house fresh air system 100 of an example embodiment enables users to keep their homes cool while keeping their security systems armed. Additionally, the whole house fresh air system 100 of an example embodiment with the wireless controller 150 can be compatible with almost every conventional whole house fan system on the market today and is easy to convert over to a WiFi enabled wireless controller.

Figure 3:
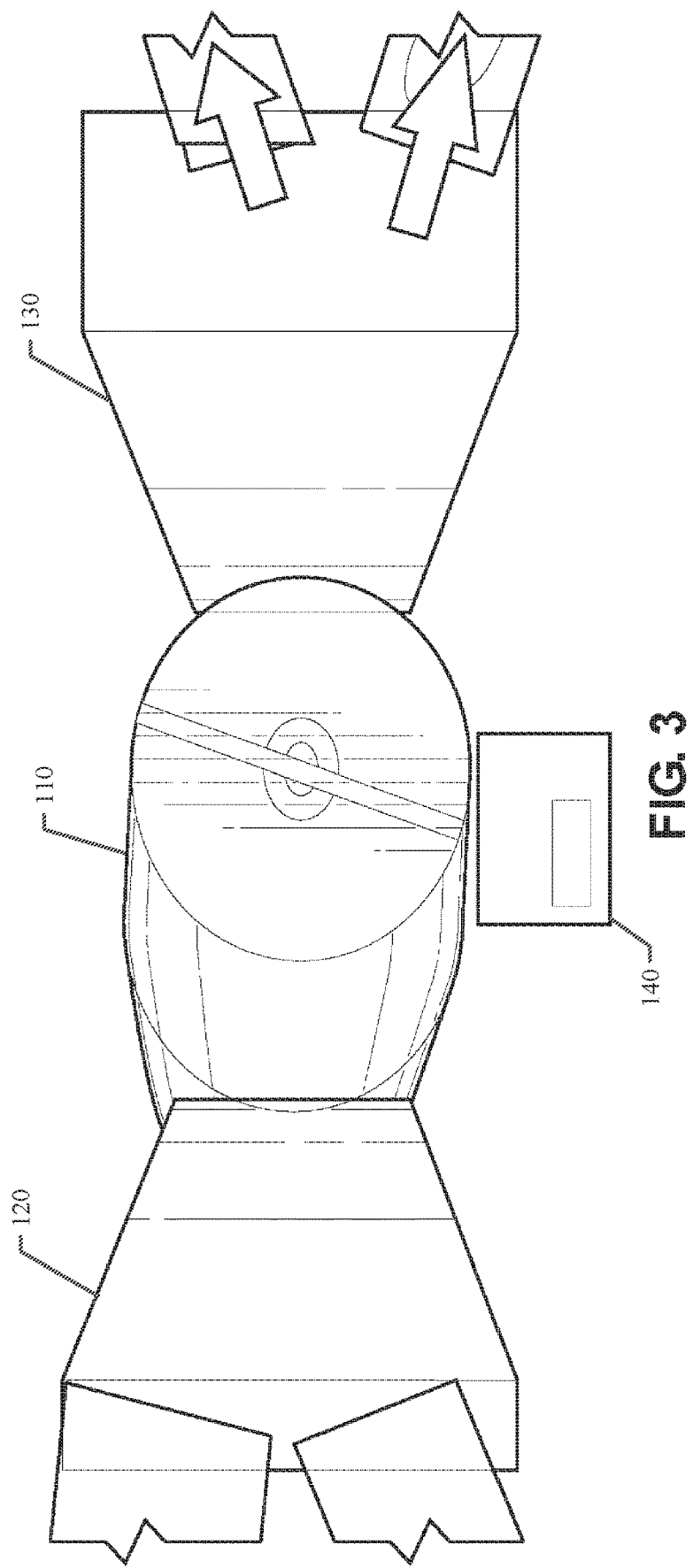
FIG. 3 illustrates a detail of an example embodiment of the whole house fresh air system showing the damper, the collector box, the disburser box, and the local control unit.

Referring now to FIG. 3, a detail of an example embodiment of the whole house fresh air system 100 shows the damper 110, the collector box 120, the disburser box 130, and the local control unit 140. The collector box 120 serves to collect fresh outside air from the plurality of intake vents 122 and provide the fresh outside air to the damper 110. The damper 110 is provided to controllably cause and regulate the flow of fresh outside air through the whole house fresh air system 100. The damper 110 can be implemented as a controlled fan. The local control unit 140 is provided to control the operation of the damper 110 and to provide an interface to the wireless remote controller 150, which can be used to remotely and wirelessly control the operation of the whole house fresh air system 100 via the local control unit 140. The local control unit 140 can be implemented as a circuit board or combination of electrical components, which can enable a user to control the operation of the damper 110. In an example embodiment, the damper 110 can be powered and manipulated by a 24 volt actuator under control of the local control unit 140. The conventional use of dampers is well known in the art. The 24 volt damper actuator can be energized by the local control unit 140 based on commands sent wirelessly by the wireless remote controller 150. In the example embodiment, the damper 110 is also connected to the disburser box 130, which supplies fresh outside air to a plurality of output vents 132 via output ducts 134. The plurality of output vents 132 can be implemented as ceiling mounted round filtered vents, as described in more detail below.

Figure 4:
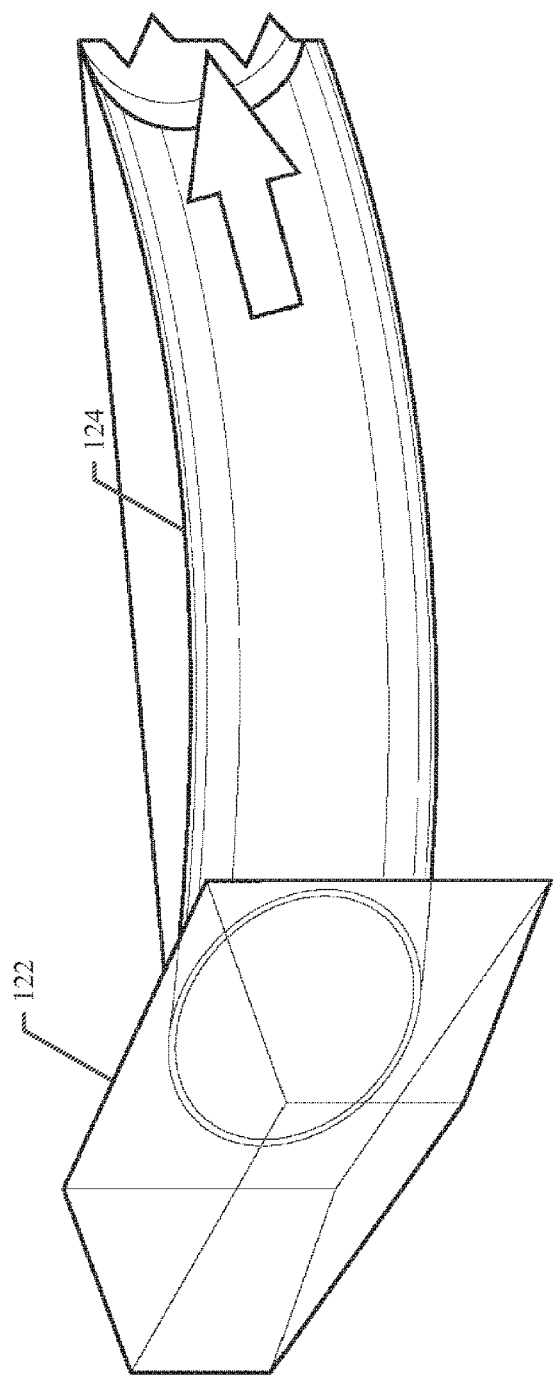
FIG. 4 illustrates a detail of an example embodiment of the whole house fresh air system showing the intake vents and the intake ducts.

FIG. 4 illustrates a detail of an example embodiment of the whole house fresh air system 100 showing the intake vents 122 and the intake ducts 124. A plurality of intake vents 122 can be installed between trusses of a structure and mounted under the eaves or soffits of the roof. Each of the intake vents 122 can be equipped with a framed screen (e.g., a 4"×22" fine mesh screen) on the outside to eliminate the entry of animals, bugs or debris. Each of the intake vents 122 can be connected to an intake duct 124 (e.g., an R-8 flexible duct). Each of the intake ducts 124 can be routed through an attic or crawl space of a structure and connected to the collector box 120 as described above.

Figure 5:
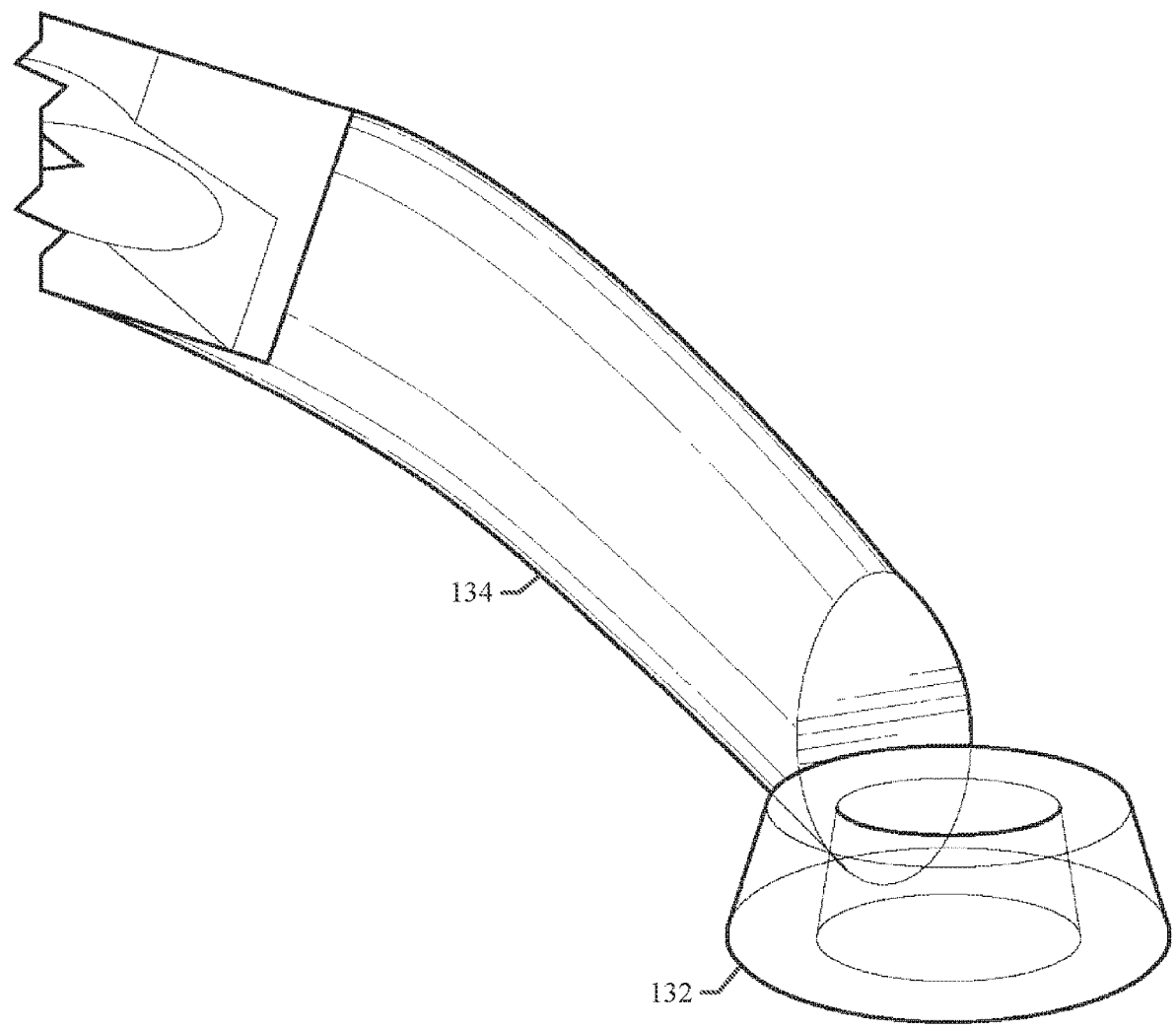
FIG. 5 illustrates a detail of an example embodiment of the whole house fresh air system showing the output vents and the output ducts.
Figure 5:
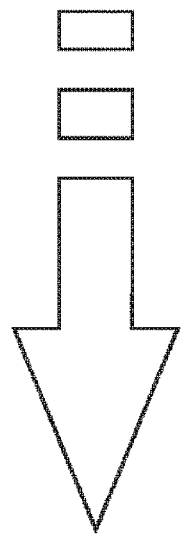

FIG. 5 illustrates a detail of an example embodiment of the whole house fresh air system 100 showing the output vents 132 and the output ducts 134. As described above, the disburser box 130 supplies fresh outside air to a plurality of output vents 132 via output ducts 134. A plurality of output ducts 134 can be routed through an attic or crawl space of a structure and connected at one end to the disburser box 130. A plurality of output vents 132 can be connected to the other end of the output ducts 134. In an example embodiment, the plurality of output vents 132 can be implemented as ceiling mounted round filtered vents as described in more detail below.

FIGS. 6 through 8 illustrate a detail of an example embodiment of the whole house fresh air system 100 showing the output vents 132 with a perforated removable grill 170 and a replaceable filter 171. In the example embodiment, the output vents 132 can each have a hinged or non-hinged perforated removable grill 170 (also see FIG. 9) to allow a replaceable filter 171 to be inserted into and retained by the output vent 132. This replaceable filter 171 serves to filter out any outdoor pollens and allergens from entering the home or structure. The perforated removable grill 170 can be hinged or otherwise attached to a removable inner threaded female portion 172, which can be screwed onto or otherwise removably attached to a threaded male lip 173 of the output vent 132. In various example embodiments, the removable grill 170 can be hinged or non-hinged and fixed to the removable inner threaded female portion 172. As a result, the removable grill 170 can capture the replaceable filter 171 within the output vent 132 and allow fresh filtered air from outside of the structure to flow through the output vent 132 and into the interior of the structure.

FIGS. 9 and 10 illustrate a detail of an example embodiment of the whole house fresh air system 100 showing the output vents 132 with a hinged perforated removable grill 170, a replaceable filter 171, and an embedded orbital light 180. As described above, the output vents 132 can each have the hinged perforated removable grill 170 to allow a replaceable filter 171 to be inserted into and retained by the output vent 132. The hinged perforated removable grill 170 can be hinged or otherwise attached to a removable outer ceiling plate 176, which can be screwed onto or otherwise removably attached to a portion of the output vent 132. A grill hinge 174 and grill attachment catch 175 is provided to allow access to an interior portion of the output vent 132 for maintenance of the replaceable filter 171 and an orbital light 180. In other embodiments, the removable grill 170 can be non-hinged and fixed to the removable outer ceiling plate 176. As a result, the removable grill 170 can capture the replaceable filter 171 within the output vent 132 and allow fresh filtered air from outside of the structure to flow through the output vent 132 and into the interior of the structure. In an example embodiment, the outer ceiling plate 176 of the output vent 132 can have the option for an orbital 24 volt light 180 to be inserted or embedded into the outer ceiling plate 176 to provide a lighted output vent 132 option. The orbital light 180 can be powered by a battery or electrical conduit. In this embodiment, the lighted output vent 132 can include a wireless receiver 177 for control of the orbital light 180 by use of the wireless remote controller 150. Thus, the lighted output vent 132 can provide both fresh filtered air and light to the interior of the structure.

FIG. 11 illustrates a flow diagram representing a sequence of operations performed in a method according to an example embodiment. In accordance with the example method 1000, the method comprises: installing a damper in a structure (operation 1010); coupling a collector box to an intake side of the damper (operation 1020); coupling a disburser box to an output side of the damper (operation 1030); mounting a plurality of intake vents to the structure, the plurality of intake vents having access to fresh air outside of the structure (operation 1040); connecting the plurality of intake vents to the collector box via a plurality of intake ducts routed through an interior of the structure (operation 1050); installing a plurality of output vents within the structure, the plurality of output vents having access to air inside of the structure (operation 1060); and connecting the plurality of output vents to the disburser box via a plurality of output ducts routed through an interior of the structure (operation 1070).

The illustrations of embodiments described herein are intended to provide a general understanding of the structure of various embodiments, and they are not intended to serve as a complete description of all the elements and features of components and systems that might make use of the structures described herein. Many other embodiments will be apparent to those of ordinary skill in the art upon reviewing the description provided herein. Other embodiments may be utilized and derived, such that structural and logical substitutions and changes may be made without departing from the scope of this disclosure. The figures herein are merely representational and may not be drawn to scale. Certain proportions thereof may be exaggerated, while others may be minimized. Accordingly, the specification and drawings are to be regarded in an illustrative rather than a restrictive sense.

The description herein may include terms, such as "up", "down", "upper", "lower", "first", "second", etc. that are used for descriptive purposes only and are not to be construed as limiting. The elements, materials, geometries, dimensions, and sequence of operations may all be varied to suit particular applications. Parts of some embodiments may be included in, or substituted for, those of other embodiments. While the foregoing examples of dimensions and ranges are considered typical, the various embodiments are not limited to such dimensions or ranges.

The Abstract is provided to allow the reader to quickly ascertain the nature and gist of the technical disclosure. The Abstract is submitted with the understanding that it will not be used to interpret or limit the scope or meaning of the claims.

In the foregoing Detailed Description, various features are grouped together in a single embodiment for the purpose of streamlining the disclosure. This method of disclosure is not to be interpreted as reflecting an intention that the claimed embodiments have more features than are expressly recited in each claim. Thus, the following claims are hereby incorporated into the Detailed Description, with each claim standing on its own as a separate embodiment.

As described herein, a whole house fresh air system with a wireless interface are disclosed. Although the disclosed subject matter has been described with reference to several example embodiments, it may be understood that the words that have been used are words of description and illustration, rather than words of limitation. Changes may be made within the purview of the appended claims, as presently stated and as amended, without departing from the scope and spirit of the disclosed subject matter in all its aspects. Although the disclosed subject matter has been described with reference to particular means, materials, and embodiments, the disclosed subject matter is not intended to be limited to the particulars disclosed; rather, the subject matter extends to all functionally equivalent structures, methods, and uses such as are within the scope of the appended claims.

What is claimed is:

1. A whole house fresh air system comprising:
   a damper installed in a structure;
   a collector box coupled to an intake side of the damper;
   a disburser box coupled to an output side of the damper;
   a plurality of intake vents mounted to the structure, the plurality of intake vents having access to fresh air outside of the structure, the plurality of intake vents being coupled to the collector box via a plurality of intake ducts routed through an interior of the structure; and
   a plurality of output vents installed within the structure, the plurality of output vents having access to air inside of the structure, the plurality of output vents being coupled to the disburser box via a plurality of output ducts routed through an interior of the structure.

2. The whole house fresh air system of claim 1 including a local control unit to control the operation of the damper.

3. The whole house fresh air system of claim 2 including a wireless remote controller to command operation of the local control unit.

4. The whole house fresh air system of claim 1 wherein the damper includes a fan.

5. The whole house fresh air system of claim 1 wherein the plurality of intake vents are mounted under eaves or soffits of a roof of the structure.

6. The whole house fresh air system of claim 1 wherein the plurality of output vents are ceiling mounted round filtered vents.

7. The whole house fresh air system of claim 1 wherein each of the plurality of output vents includes a removable filter.

8. The whole house fresh air system of claim 1 wherein each of the plurality of output vents includes a perforated removable grill.

9. The whole house fresh air system of claim 1 wherein each of the plurality of output vents includes a hinged perforated removable grill.

10. The whole house fresh air system of claim 1 wherein each of the plurality of output vents includes an embedded light.

11. A method comprising:
    installing a damper in a structure;
    coupling a collector box to an intake side of the damper;
    coupling a disburser box to an output side of the damper;
    mounting a plurality of intake vents to the structure, the plurality of intake vents having access to fresh air outside of the structure;
    connecting the plurality of intake vents to the collector box via a plurality of intake ducts routed through an interior of the structure;
    installing a plurality of output vents within the structure, the plurality of output vents having access to air inside of the structure; and
    connecting the plurality of output vents to the disburser box via a plurality of output ducts routed through an interior of the structure.

12. The method of claim 11 including coupling a local control unit to the damper to control the operation of the damper.

13. The method of claim 12 including providing a wireless remote controller to command operation of the local control unit.

14. The method of claim 11 wherein the damper includes a fan.

15. The method of claim 11 including mounting the plurality of intake vents under eaves or soffits of a roof of the structure.

16. The method of claim 11 wherein the plurality of output vents are ceiling mounted round filtered vents.

17. The method of claim 11 wherein each of the plurality of output vents includes a removable filter.

18. The method of claim 11 wherein each of the plurality of output vents includes a perforated removable grill.

19. The method of claim 11 wherein each of the plurality of output vents includes a hinged perforated removable grill.

20. The method of claim 11 wherein each of the plurality of output vents includes an embedded light.

* * * * *